United States Patent [19]

Grallert et al.

[11] Patent Number: 4,612,573
[45] Date of Patent: Sep. 16, 1986

[54] METHOD FOR CLOCK RATE CONVERSION

[75] Inventors: Hans-Joachim Grallert, Gröbenzell; Alexander Starck, Munich, both of Fed. Rep. of Germany

[73] Assignee: Siemens Aktiengesellschaft, Berlin and Munich, Fed. Rep. of Germany

[21] Appl. No.: 650,652

[22] Filed: Sep. 14, 1984

[30] Foreign Application Priority Data

Sep. 14, 1983 [DE] Fed. Rep. of Germany ....... 3333225

[51] Int. Cl.⁴ .................. H04N 7/13; H04N 7/01
[52] U.S. Cl. ............................. 358/140; 370/84; 340/347 DD
[58] Field of Search ................ 358/140; 370/84; 340/347 DD

[56] References Cited

U.S. PATENT DOCUMENTS

| | | | |
|---|---|---|---|
| 3,666,888 | 5/1972 | Sekimoto | 358/136 |
| 4,069,504 | 1/1978 | Jolivet et al. | 358/142 |
| 4,074,307 | 2/1978 | Dischert et al. | 358/8 |
| 4,224,481 | 9/1980 | Russell | 358/132 |
| 4,471,381 | 9/1984 | Kasuga | 358/140 |
| 4,488,176 | 12/1984 | Bond | 358/140 |
| 4,496,974 | 1/1985 | Heitman | 358/140 |

FOREIGN PATENT DOCUMENTS 0013124 7/1980 European Pat. Off. .

OTHER PUBLICATIONS

Haskell, B. G., "Sampling Rate Conversion for NTSC Color Television", IEEE Trans. on Communications, vol. COM-25, No. 7, Jul. 1977, pp. 707-712.
Kraus, Von Günther, "Notes on the Theory of Linear, Time-Discrete Signal Processing with a Rational Sampling Rate Conversion", Frequenz, vol. 36, No. 10, 1982, pp. 275-279.
Lowry et al, "Coder/Decoder Units for RGB and NTSC Signals", S.M.P.T.E. Journal, vol. 90, No. 10, Oct. 1981, pp. 945-948.

Primary Examiner—Howard W. Britton
Attorney, Agent, or Firm—Hill, Van Santen, Steadman & Simpson

[57] ABSTRACT

A method for clock rate conversion of digitized television signals for the acquisition of a television signal having a prescribed processing clock rate is provided wherein the digitized television signal is band-limited, a clock rate conversion being subsequently undertaken. The television signal having a second clock rate is written into a memory 6 and is, in turn, read with the prescribed processing clock rate, whereby an unaltering plurality of data words corresponding to picture points is not output in every television line.

8 Claims, 2 Drawing Figures

METHOD FOR CLOCK RATE CONVERSION

BACKGROUND OF THE INVENTION

1. Field of the Invention

The present invention relates to a method for clock rate conversion of digitized television signals for generating a television signal having a prescribed processing clock rate given a fixed scan clock rate of the coded television signal.

2. Description of the Prior Art

The clock rates for sampling an analog television signal and the clock rate for further processing or, respectively, transmission of the digitized television signal are rigidly prescribed in the transmission of black-and-white and color television signals. These clock rates frequently do not coincide and likewise do not have a rational relationship. A clock rate conversion by which television signals having prescribed processing clock rates are acquired must then occur. These television signals can be supplied to a corresponding coder for further data reduction by way of a DPCM method.

What is meant by television signals are both the luminance signals and the chrominance signals. At present, the method is of interest particularly for luminance signals.

Various methods for clock rate conversion are known. A data stream having a first clock frequency is thereby converted into a second data stream having a different clock frequency. Such a method is disclosed in the periodical "Frequenz", Vol. 36, No. 10, 1982, pp. 275–279. To this end, a time-invariant, linear filter is employed to which the digitized signal values are supplied with the first clock frequency and which emits the digitized signals with a second clock frequency at the output via a summer element. This conversion method is co-employed in the present invention. The method, however, presumes that the relationship of the second clock rate to the first clock rate yields a rational value. Given the processing clock rate that are currently standard, however, this is usually not the case.

SUMMARY OF THE INVENTION

It is therefore the object of the present invention to provide a clock rate conversion method for digitized television signals which enables the acquisition of the television signal with a prescribed processing clock rate, even given a non-rational clock ratio.

Proceeding from the art mentioned above, the object of the present invention is achieved in that the television signal is converted by way of clock rate conversion with a conversion factor representing a rational number, being converted into a second television signal having a second clock rate, in that the data words of the second television signal are written into a memory with the second clock rate, and in that, of the stored data words of each television line, a plurality of data words deviating therefrom is read with the processing clock rate.

The extremely difficult problem of clock rate conversion given non-rational clock relationships is resolved in a simple manner by way of the present invention by the emission or addition of a few (m) digital signal values (picture points). The luminance signal, or a chrominance signal as well, is generally referred to here as a television signal. This is achieved via a memory in which, for example, all picture points of a television line are written as data words, but a few picture points at the beginning and at the end of each television line are not transmitted. The writing into the memory occurs with the second clock frequency generated by the scan rate converted and the reading of the memory occurs with the prescribed processing clock rate.

The realization of such a method presents no difficulties and requires only a slight expense. The omission of a few picture points can, of course, occur upon writing into the memory, as well as upon reading from the memory. The slight distortion of the read television pictures can hardly be noticed. It can, further, be compensated by means of a corresponding adjustment of the receiving apparatus.

It is advantageous in that the second television signal is intermediately stored in a first-in/first-out memory.

In terms of expense, the method can be most favorably implemented by using a first-in/first-out (FIFO) memory.

It is expedient that 13.5 MHz be provided as the scan rate, 10.125 MHz as the second clock rate and $\frac{3}{4}$ as the conversion factor.

The conversion of the digitized television signal having a clock rate of 13.5 MHz into a digital television signal having a second clock frequency of 10.125 MHz is expedient since only a simple conversion factor of $\frac{3}{4}$ need be realized.

It is advantageous that the first three and the last three data words of respectively 526 data words of a television line of the second television signal not be read.

The television picture is only slightly changed due to the omission of these data words.

BRIEF DESCRIPTION OF THE DRAWING

Other objects, features and advantages of the invention, its organization, construction and operation will be best understood from the following detailed description, taken on conjunction with the accompanying drawing, on which.

DESCRIPTION OF THE PREFERRED EMBODIMENTS

Figure 1:
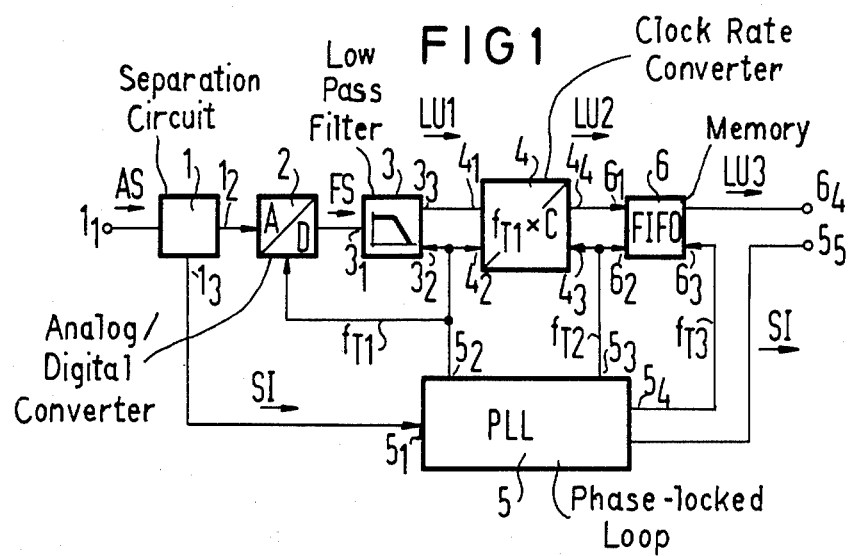
FIG. 1 is a basic block circuit diagram for clock rate conversion according to the present invention.

Referring to the drawing, an analog television signal AS is supplied to a separation circuit 1 via an input $1_1$. A first output $1_2$ of the separation circuit 1 is connected to the input of an analog/digital converter 2 which also contains a sample-and-hold circuit. A second output $1_3$ of the separation circuit 1 is connected to an input $5_1$ of a clock generator 5. The output of the analog/digital converter 2 is connected to an input $3_1$ of a digital low-pass filter 3 which has an output $3_3$ connected to the data input $4_1$ of a clock rate converter 4 which, in turn, has an output $4_4$ connected to the data input $6_1$ of a memory constructed as a first-in/first-out (FIFO) memory. The data output of the memory is referenced $6_4$. For example, the clock generator 5 contains a plurality of phase-locked loops (PLL) which serve for generating the working clocks with the frequencies $f_{T1}$, $f_{T2}$ and $f_{T3}$. At an output $5_2$, the sampling frequency $f_{T1}$ is supplied to the analog/digital converter 2 and the digital low-pass filter 3 via its clock input $3_2$. The same frequency is supplied to the clock rate converter 4 via its clock input $4_2$. A second clock frequency $f_{T2}$ is emitted at the output $5_3$ of the clock generator 5 and is supplied to the clock rate converter 4 as a read-out clock via a second clock input $4_3$, and to the memory 6 via its first clock input $6_2$. The processing clock rate $f_{T3}$ is supplied from a third clock output $5_4$ of the clock generator to the second clock input $6_3$ of the memory 6. Synchronizing pulses SI are also output at the output $5_5$ of the clock generator.

In this exemplary embodiment, a luminance signal which is referred to generally as a television signal in the following text is acquired from a closed-coder color television signal FS.

Figure 2:
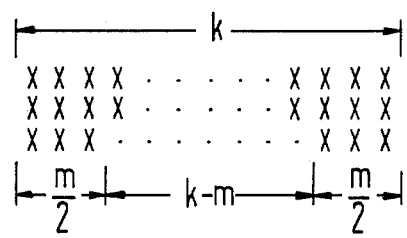
FIG. 2 is a schematic representation of an excerpt from a television picture.

A digitized color television signal FS is acquired from the analog television signal AS via the analog/-digital converter 2. The television signal LU1 is filtered out of the color television signal by the low-pass filter 3 whose limit frequency lies at about 3.9 MHz. The clock rate converter 4 converts the television signal LU1 into a second television signal LU2 whose frequency lies close to the processing frequency $f_{T3}$. When the sampling of the analog television signal AS occurred with 13.5 MHz, then the television signal LU1 at the output of the digital low-pass filter 3 has the same data word rate. The data word rate is converted to 10.125 MHz by way of the clock rate converter 4. The conversion factor C of the clock rate converter 4 thereby amounts to $\frac{3}{4}$. The data words are written into the memory 6 with a clock having the same frequency $f_{T2}$. The reading occurs with a prescribed processing clock 10 MHz. The first three (m/2) and the last three data words of the luminance signal LU2 are respectively not written given use of a FIFO memory and, therefore, are not read (FIG. 2). The second clock frequency $f_{T2}$ is synchronized with the processing clock rate $f_{T3}$ via a phase-locked loop. The line sync pulses that are contained in the synchronizing pulses SI are employed for this purpose. A simple suppression of the write operation is also possible by way thereof by inhibiting the clock used for writing.

The synchronizing pulses SI are generally output separately from the television signal 3 read from the memory 6.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A clock rate conversion method for first digitized television signals of television lines sampled at a first clock rate into second television signals having a predetermined processing clock rate, comprising the steps of:
   generating clock signals having a first clock rate ($f_{T1}$), a second clock rate ($f_{T2}$) and, as the predetermined processing clock rate, a third clock rate ($f_{T3}$), where the second clock rate is related to the first clock rate by a rational number conversion factor (C) and is close to the third clock rate;
   sampling the first digitized television signals at the first clock rate ($f_{T1}$) to obtain data words;
   converting the data words to the second clock rate ($f_{T2}$) and storing the same; and
   reading a plurality of data words (K±m) of K data words of each television line at the third clock rate ($f_{T3}$).

2. The method of claim 1, wherein the step of storing is further defined as:
   storing the data words on a first-in/first-out basis.

3. The method of claim 1, wherein the step of generating clock signals is further defined as:
   generating the first clock rate ($f_{T1}$) at 13.5 MHz; and
   generating the second clock rate at 10.125 MHz with a conversion factor (C) of $\frac{3}{4}$.

4. The method of claim 1, wherein the step of storing and reading are further defined as:
   storing 526 data words for each television line on a first-in/first-out basis; and
   reading all of the data words for each line except the first three data words and the last three data words.

5. The method of claim 1, wherein the step of reading is further defined as:
   reading more data words than stored for each television line as a black or gray luminance value.

6. The method of claim 1, and further comprising the step of:
   filtering the sampled first digitized television signals with a digital low-pass filter.

7. The method of claim 1, wherein the step of generating clock signals is further defined as:
   generating the clock signals with at least one phase-locked loop.

8. The method of claim 1, and further comprising the step of:
   selecting the conversion factor (C) to have the lowest possible numerator and the lowest possible denominator.

* * * * *